May 4, 1965 F. ZIMMERN 3,181,296
GAS ENGINE WITH CONTINUOUS FUEL INJECTION
Filed Jan. 31, 1962 4 Sheets-Sheet 1

INVENTOR
F. Zimmern
ATTORNEYS

May 4, 1965 F. ZIMMERN 3,181,296
GAS ENGINE WITH CONTINUOUS FUEL INJECTION
Filed Jan. 31, 1962 4 Sheets-Sheet 2

INVENTOR
F. Zimmern
By Holcomb, Wittich & Graham
ATTORNEYS

May 4, 1965  F. ZIMMERN  3,181,296
GAS ENGINE WITH CONTINUOUS FUEL INJECTION
Filed Jan. 31, 1962  4 Sheets-Sheet 3

INVENTOR
F. Zimmern
ATTORNEYS

Inventor

FERNAND ZIMMERN

By Holcombe, Wetherill + Brisebois
Attorneys

United States Patent Office 3,181,296
Patented May 4, 1965

3,181,296
GAS ENGINE WITH CONTINUOUS FUEL
INJECTION
Fernand Zimmern, 29 Blvd. Jules Sandeau, Paris, France
Filed Jan. 31, 1962, Ser. No. 170,183
Claims priority, application France, Feb. 2, 1961,
851,703, Patent 1,287,593
20 Claims. (Cl. 60—39.63)

Certain well-known rotary compressors or turbines comprise several compression or expansion chambers consisting of the spaces between the adjacent threads of a rotating screw, said chambers being peripherally closed by contact between the crests of the threads and the casing, and blocked at one end by a fixed plate in contact with the corresponding end of said screw, and at the other end by pinions positioned two by two in planes passing through a diameter of the screw, the teeth of said pinions serving as pistons during the rotation of the screw.

It is conventional to render the compression or expansion chambers fluid-tight by using fluid seals near said pinions.

Devices of this type have been described in prior U.S. Patent No. 3,133,695.

The object of the present invention is to provide a rotary gas engine with continuous fuel injection, comprising in combination a compressor and motor of the aforementioned type, the rotors of which are coupled together on the same shaft, with an angular displacement between the pinions of the compressor and motor so that the compressed gases leaving the compressor may enter a combustion chamber in the angular space between the compressor outlet and the motor inlet. Any suitable fuel may be continuously injected into this combustion chamber, even without lubricant.

Such a plant operates on a thermal cycle comparable to that of conventional gas turbines, but without requiring a secondary injection of air before expansion.

Another object of the present invention is to provide improvements in rotary gas engines of the aforesaid type, in order to permit high compression ratios to be obtained in a single stage, while simplifying the construction of the plant, and also improving the circulation of the cooling fluid, and the sealing of the compressor and motor.

In order to make it easier to obtain high compression ratios, the outer profile of the screw (which was generated by rotating a circular arc, the center of which coincided with that of said pinions) is replaced in the present invention by a cylindrical outer profile, the screw threads being then shortened, especially at the end corresponding to the maximum gas pressure.

It will be hereinafter seen that this arrangement permits the compression or expansion ratio to be increased in comparison with that of previously known compressors or turbines.

In addition to the simplified construction represented by this new arrangement, this invention, by reducing the height of the teeth in the high pressure zone, permits the use of thinner teeth without reducing their resistance to pressure, and thus increases the useful space between the teeth.

It also leads to elongation of the leakage path between the contiguous threads of the screw, along the wall of the fixed casing, in the high pressure zones, thus reducing the possible losses in gas pressure.

The new rotary gas engine also comprises a centrifugal device by means of which the gas and liquid leaving the compressor through a single outlet may be separated, the gas being removed from the liquid before being brought into contact with a fuel injected under pressure into the combustion chamber, while the liquid follows its own circuit to provide for the sealing and cooling of the motor.

This centrifugal device automatically maintains a desired relationship between the liquid entering the motor and that delivered from the compressor, and thus permanently maintains a liquid curtain of substantially constant thickness around the centrifuge.

The new engine also comprises means for separating the exhaust gases and liquids leaving the turbine. This separator may operate by gravity or centrifugally. The engine also comprises volumetric pumps for recirculating liquid collected in a reservoir, which liquid may be passed through a heat exchanger to cool it before it is re-admitted at the inlet of the plant, and may also be passed before re-admission through a purifier for elimination of any acids dissolved therein.

The liquid recirculating pumps, as well as the fuel injection pump, may be driven from the rotor of the engine, through appropriate reduction gearing, of the worm and tangent gear type, for example.

The new engine yields a horsepower per unit of weight which is much greater than that of piston engines and of the order of that of conventional gas turbines, which nevertheless permitting high compression ratios to be obtained, which is not easy with the latter type of machine.

It follows that the thermal efficiency of the new engine is improved. Moreover, because of the increased dimensions of the motor relative to those of the compressor, it is possible to prolong the expansion of the gas without cutting it off, thus saving energy which is necessarily lost in piston engines where the volume available to the expanding gas is no greater than the intake volume.

The new engine also offers the advantage of having a much smaller surface in contact with the hot gases than those of equivalent piston engines. This compensates for the increase in heat exchange due to the use of a lower wall temperature.

Finally, as a consequence of the direct use of rotary motion, the losses from mechanical transmission and due to the auxiliaries are less than those in piston engines of known types.

Other characteristics of the present invention will be better understood from reading the following description of one embodiment of the new plant given purely by way of example, and described in connection with the accompanying drawings, in which.

Figure 8:
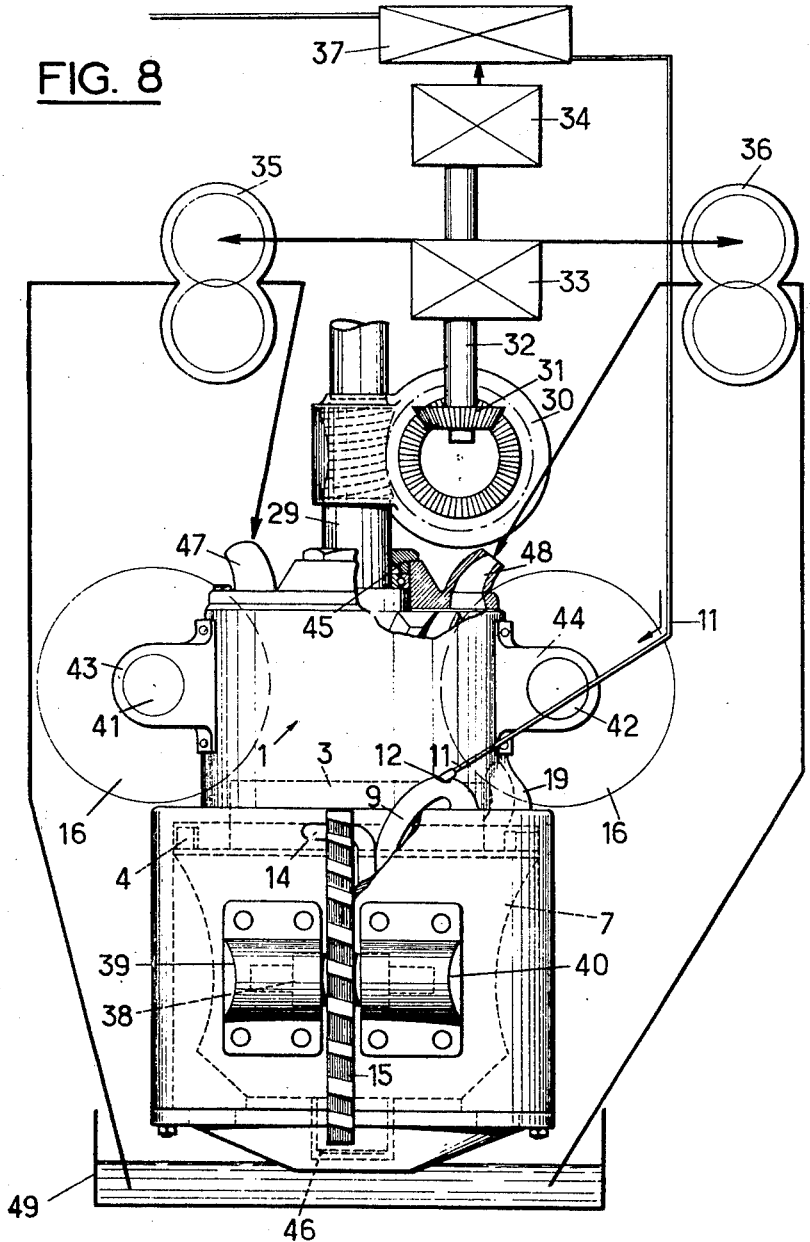
Figure 9:
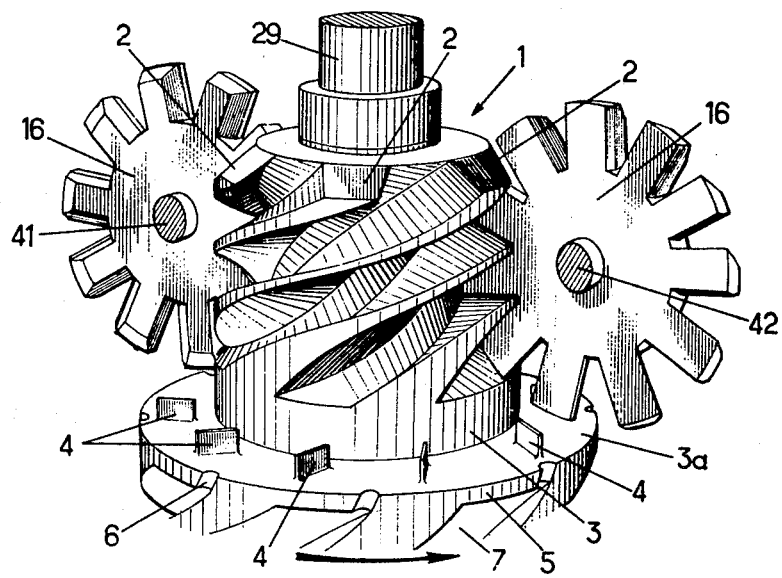
Figure 10:
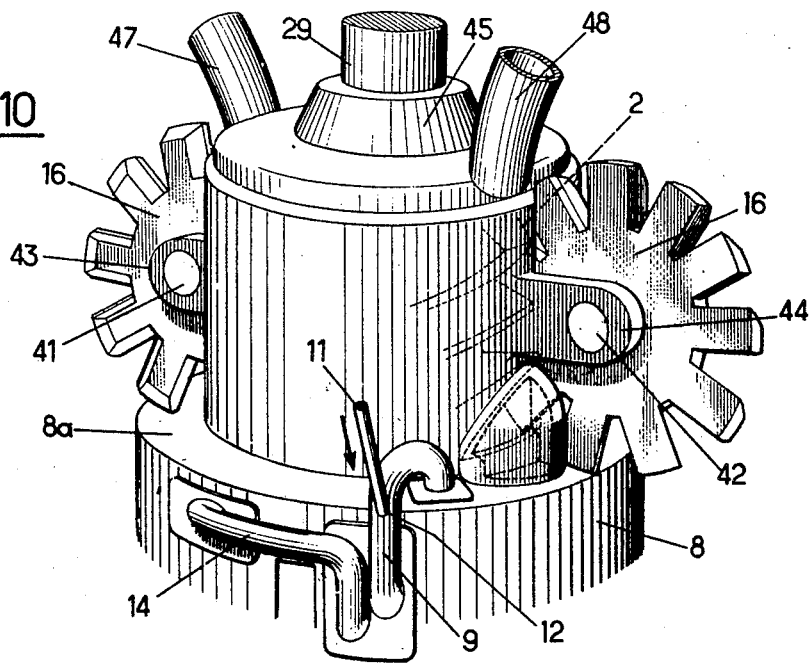

FIG. 8 is a schematic representation of the motor and its accessories, showing the recovery of the liquid with a view to its reintroduction into the upper part of the plant, and the control for the fuel injection, FIG. 9 is a perspective view of the compressor screw, with the casing removed, showing how this screw meshes with the gear wheels; and FIG. 10 is a perspective view of the compressor portion of the device, with the casing in place.

Figure 1:
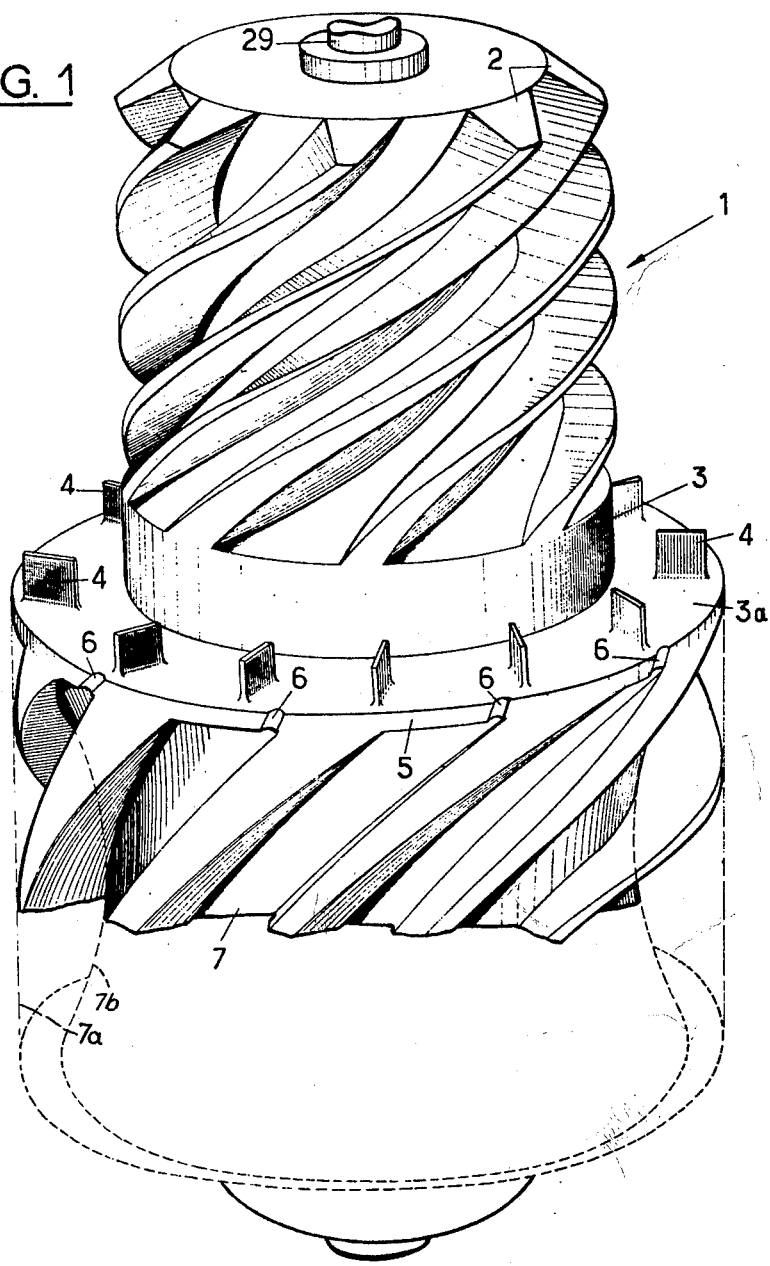
FIG. 1 is a perspective view of the rotor assembly of the engine before the mounting of the pinions which cooperate with the compressor and motor screws.

FIG. 1 shows an hour glass screw 1. The crests of the threads of this screw are cut off along a cylindrical surface. The teeth are also cut off at their upper end along a conical surface, as shown at 2.

Below the hour glass screw 1, there is a cylindrical base 3 provided with a collar 3a having a larger diameter, the annular space between these two diameters accommodating centrifuge fins 4, which are slightly inclined with respect to the diametral planes passing therethrough.

It will be hereinafter seen that a stream of liquid created by centrifugal force is formed on that portion of the collar 3a lying between the fins 4 and its peripheral edge 5.

The collar 3a is provided with grooves 6 through which the liquid falls into the motor, the screw in which is designated by reference number 7, thus ensuring a fluid seal between the lower part of the casing (which is, like its upper part, cylindrical, as shown in 7a, FIG. 1, but larger in diameter) and the crests of the screw threads of the motor. As seen in FIG. 1, the roots of these screw threads define an hour glass outline 7b in a plane taken through the axis of the screw.

Figure 2:
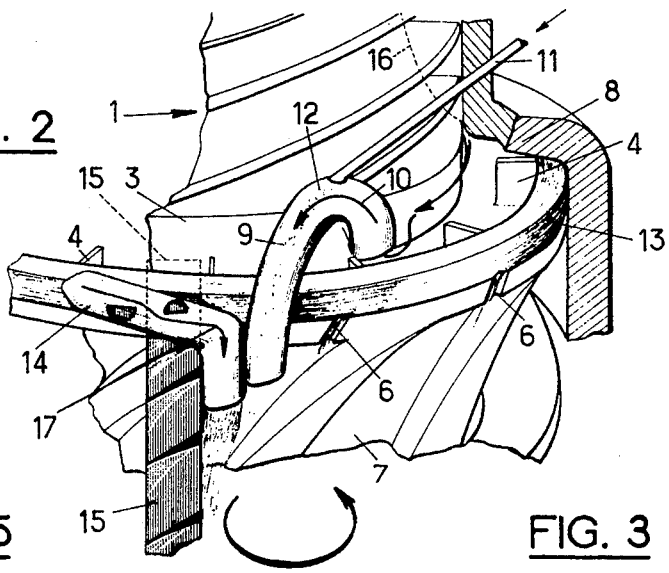
FIG. 2 is a perspective view showing schematically the gas circuit and a portion of the liquid circuit which provides the liquid seal, especially near said pinions, the casing having been broken away.

FIG. 2 shows that the casing 8 is made in a single piece, with its small end up, and encircles the two screws 1 and 7, while sealingly contacting the crests of the threads on these screws.

FIG. 2 also shows a combustion chamber 9, into which flow the gases coming from the centrifuge, in the direction of the arrow 10, before reaching the upper part of one of the expansion chambers formed between the threads of the screw 7.

The arrow 11 indicates the inflow of fuel injected at 12 into the combustion chamber 9. This fuel injection may take place continuously, and this considerably simplifies the injection apparatus, since the supply of compressed gas, although pulsating, is substantially continuous.

The arrows in the grooves 6 show the direction of flow of the liquid which provides the seal between the crests of the screw 7 and the lower part of the casing.

The liquid ring created by centrifugal force is designated by reference number 13.

It will be seen that part of this stream of liquid is drawn off through a duct 14 passing around the pinions 15 of the turbine, which pinions are perpendicular to the plane of the pinions 16 of the compressor, only the outline of which is shown in broken lines on FIG. 2.

The liquid which is to provide the seal along the crests of the threads 15 follows the direction of the arrow 17, to flow along the teeth of said pinions.

This flow of liquid is slowed by baffles so as to permanently maintain a liquid ring of a minimum thickness, which remains constant because any increase in its thickness results in an increase in the mass of liquid between the centrifuging blades, and consequently in the hydrostatic pressure which determines the rate of flow of the liquid toward the turbine. This rate of flow is thus dependent on and equal to the output flow from the compressor.

Only the one of the two pinions turned toward the front of the apparatus is visible on FIG. 2, but it goes without saying that a passage symmetrically disposed with respect to the passage 14 is provided at the back in order to provide a fluid seal along the side of the pinion on the opposite side of the turbine, as well as that a combustion chamber which is symmetrically located relative to the chamber 9 is located at the back of the motor.

Figure 3:
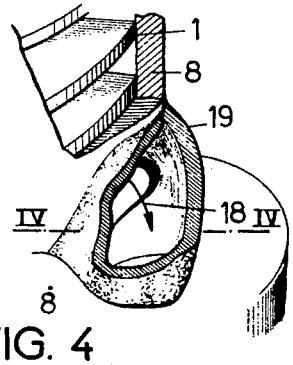
FIG. 3 is a fragmentary perspective view, with a portion broken, away, showing the departure of the moist compressed gases toward the centrifugal device.
Figure 4:
FIG. 4 is a section along the line IV—IV of FIG. 3.

On FIG. 3, which is a fragmentary view of screw 1 in the casing 8, it will be seen that at the base of the screw 1, the gases leaving the compressor in the direction of the arrow 18 pass through the casing 8 at the level of a projecting portion 19 shown on FIGS. 3 and 4, whence it redescends into the centrifuge, passing again through the casing 8.

Figure 5:
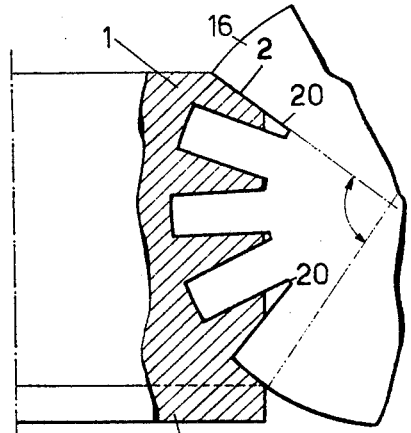
FIG. 5 is a diametral section through one of the screws, showing the way in which the various threads cooperate with the teeth of the pinions.

FIG. 5 is a partial diametral cross-section through the compressor screw 1 and a pinion 16 which meshes with the threads of the screw 1.

The profile of the threads of the screw is cross-hatched of FIG. 5, the spaces between the roots of the teeth of the pinion 16 being shown at 20 and it will be seen that at the upper and lower parts of the screw the teeth of this screw cannot re-enter the root spaces 20 without permitting the compressed gases to reach them.

FIG. 5 also shows the cylindrical base 3 of the compressor.

Figure 7:
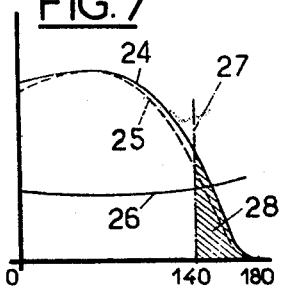

In operation, the compressor screw 1 is turned by the shaft 29 which is driven by the motor screw 7. Air or some other suitable working gas is supplied at the top of the compressor through suitable openings, at the same time that a cooling fluid is supplied through 47 and 48 (FIG. 7). The air first fills the spaces between the threads of the screw 1. As this screw turns toward the right of the figures, these spaces are successively closed at their upper ends by the gear teeth 20. Continued rotation steadily decreases the length of the chamber formed between each pair of teeth, the casing 8, base 3 of the screw 1, and the gear teeth 20, compressing the gas therein and turning the gear downwardly until each chamber comes into registration with the entrance to a passageway formed in a projection 19 on the casing wall. This passageway leads the gases into the centrifuge.

At the same time, the liquid introduced at 47 and 48 flow down those faces of the pinion teeth toward which the screw 1 is turning and along the surfaces of the screw threads, thus forming a liquid seal between the screw threads and pinion teeth. The pressure of the compressed air tends to force this liquid against the pinion teeth, where it forms the equivalent of a second liquid pinion laminated against the metal pinion.

Leakage of compressed gas is thus prevented, and if anything escapes through the clearances between the screw threads and pinion teeth, it will be the cooling liquid, the viscosity of which reduces such leakage to a minimum.

It will be appreciated that by adjusting the volume of flow of the liquid, it is possible to effectively reduce the residual volume of the combustion chambers formed between the screw threads which is available to the gas, particularly at the moment of maximum compression, thereby adjusting the compression ratio.

The liquid then falls into the centrifuge, where it is separated from the air which arrives through the passage 18. The liquid then enters the motor through the holes 6 and the duct 14, while the air is drawn into the combustion chamber 9 through the duct 10. Fuel is supplied to the combustion chamber through the duct 11, and the expanding gases enter the motor as shown in FIGS. 2, 2a, 2b. At the bottom of the motor the gases are exhausted to the ambient atmosphere, while the liquid falls into the sump 49, from which it is recirculated to the top of the compressor by the pumps 36, 37.

Figure 6:
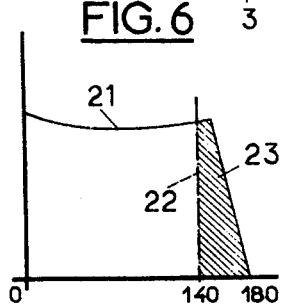
FIGS. 6 and 7 are diagrams showing the reduction in volume of the compressed gases, resulting from the reduction in the thickness of the threads at the point where the gas pressure is highest.

The curve 21 of FIG. 6 shows, as a function of the angle of rotation of the screw, the proportional value of the diametral section of the space between two adjacent threads, which it is necessary to take into account in calculating the final compression ratio to be obtained in the case of a screw having threads of constant thickness throughout the entire height of the screw, as in the case of the apparatus described in U.S. Patent No. 3,133,695.

It will be seen that the first part of this curve does not have a constant ordinate, as might be thought at first glance. This anomaly results from the fact that it is necessary to take into account the displacement of the center of gravity of said section with respect to the axis of the screw, and to multiply the instantaneous value of the diametral section by a coefficient corresponding to the variation in the distance between this center of gravity and the axis of the screw.

The second part of the curve 21 corresponds to the period during which the useful section of the tooth of the pinion which is acting as the gas compressor decreases in a substantially linear manner, while, for a certain angular displacement of the screw, the lower part of this pinion tooth penetrates into the base plate.

It should be noted that, in the example under consideration, the hour glass screw of the compressor is symmetrical about its horizontal median plane, the threads occupying an angular interval of 30° on opposite sides of said horizontal plane, which determines the said coefficient of variation of said distance from the center of gravity.

The abscissa of the line 22 of the FIG. 6 corresponds to the opening of the outlet and the cross-hatched zone 23 corresponds to the volume of compressed gas, whereas the total area between the curve 21 and the X axis represents the volume of gas admitted.

The curve 24 in solid lines on FIG. 7 corresponds to the curve 21 of FIG. 6, while the curve 25 in broken lines corresponds to the diametral section of the screw, which in the case of the present invention has a cylindrical outer profile, that is to say, has threads which vary in height from its center toward its upper and lower ends.

The new screw has preferably a height corresponding to an angle of 90° of the total instead of 60°, the angular distance corresponding to the height above the horizontal plane of symmetry of the screw being 35°, while that corresponding to the height below this plane of symmetry is equal to 55°.

The curve 25 shows the variation of the diametral section as a function of the angle of rotation of the screw, and the curve 24 is a corrected curve taking into account the variation in the distance to the axis of the screw from the said diametral section.

The solid line 26 represents the coefficient of variation of the distance from the said center of gravity to the axis of the screw, as a function of the angular displacement of the screw.

It will be understood that the ordinates of the curve 24 are equal to those of the curve 25, multiplied by the corresponding ordinate of the curve 26, nearly unity.

The abscissae of the line 27 correspond to the opening of the outlet in the case of the new embodiment, like the line 22 in the case of the original embodiment, and the cross-hatched zone 28 corresponds to the zone 23 of FIG. 6.

On considering the ratio between this cross-hatched area and the entire area between the curve 24 and the X axis, it will be seen that the present embodiment permits a compression ratio of the order of 13, whereas that of S.N. 118,099, now Patent No. 3,133,695, permits a compression ratio of only about 6.5.

It should be noted that the cylindrical shape illustrated on the attached drawings is shown purely by way of example, and that the liquid seals used would permit the adoption of other profiles which would make it possible to obtain an even higher compression ratio, or to facilitate the introduction of liquid into the turbine.

On the drawing shown on FIG. 8, it will be seen that the shaft 29 of the control rotor drives, through reduction gearing 30 of the worm and tangent geartype, a bevel gear 31 fixed to a shaft 32, which drives two variable speed transmissions 33, 34, one of which drives at an appropriate speed the two volumetric pumps 35 and 36, which circulate the liquid, while the other drives an injection pump 37 connected to the injection line 37.

These variable speed transmissions permit the quantity of fuel injected to be regulated and also, as has been hereinbefore explained, permit a variation in the compression ratio of the compressor, as well as, to a lesser extent, a change in the expansion ratio of the motor.

The controls for these two variable speed transmissions may be advantageously so connected as to so increase the compression ratio of the compressor, when the quantity of fuel injected is increased, as to obtain an optimum thermal cycle.

The pinion 15 is mounted on a shaft 38 shown in broken lines, which turns within the two bearings 39 and 40.

The pinions 16 of the compressor are likewise mounted on two shafts 41 and 42 turning in four bearings, two of which are visible at 43 and 44 on FIG. 8.

The rotor shaft 29 is supported by two ball bearings 45 and 46.

The two liquid injection ports are respectively indicated by reference numerals 47 and 48, and the reservoir which collects the liquid leaving the turbine by reference numeral 49.

The screw 1 of the compressor and the screw 7 of the turbine have also been shown in broken lines on FIG. 8.

FIG. 9 shows the two screws 1 and 7 also seen on FIGS. 1 and 2, and the conical conformation 2 of the upper part of the screw 1.

FIG. 9 also shows the cylindrical base 3 at the lower end of the screw 1 of the compressor, the collar 3a with its edge 5, the centrifuge blades 4, the grooves 6 through which the liquid descends to the motor portion, and the pinions 16 which cooperate with the screw 1 of the compressor, as well as the axes of rotation 41 and 42 of these pinions and the drive shaft 29.

It will be seen that the teeth of the pinions are shaped to cooperate with a flank of either the upper thread or the lower thread of the screw 2.

FIG. 10 shows the casing 8, the upper part of which cooperates with the crests of the threads on the compressor screw, and the lower part of which cooperates with the crests of the motor screw 7, as well as the shafts 41 and 42 of the pinions 16 which turn in bearings 43 and 44.

As has already been explained in connection with FIGS. 3 and 4, the casing 8 is provided with a projecting portion 19 through which the compressed gases pass under the horizontal part 8a of the casing 8 into the ring of liquid 13 from which point the gas again passes under the horizontal portion 8a of the casing 8 into the combustion chamber 9, where it mixes with the fuel coming in through the tube 11.

As has been explained in connection with FIG. 2, the liquid in the ring 13 may pass through the casing 8 at a level a little higher than the top of the motor screw, so as to be then reinjected into the motor section immediately adjacent the pinions 15.

It will of course be appreciated that the particular embodiment of the invention herein described may be modified as to details, and various elements thereof replaced by equivalent elements, without thereby departing from the spirit of the invention as defined by the following claims:

What is claimed is:
1. A rotary external combustion engine comprising a compression screw and an expansion screw coaxially mounted on a common shaft, each of said screws meshing with at least one pinion lying approximately in a plane containing the longitudinal axis of said shaft, said screws comprising a base portion having an hour glass shaped axial cross section, and a plurality of discrete threads carried on said base, each extending from one end to the other of said screw while occupying a peripheral arc no greater in length than the circumference of the screw divided by the number of pinions meshing with that screw, casing means in which said screws are rotatably mounted and comprising a cylindrical inner wall co-operating with the crests of said threads to form with each pair of adjacent threads on said compression screw a compression chamber and with each pair of adjacent threads on said expansion screw an expansion chamber, a high pressure outlet immediately adjacent each pinion at the end of the compression screw nearest said expansion screw for successive communication with said compression chambers as said screws rotate, means closing the high pressure ends of all compression chambers not in communication with a high pressure outlet, a low pressure inlet at the other end of the compression screw, a high pressure inlet immediately adjacent each pinion at the end of the expansion screw nearest said compression screw, a low pressure outlet at the other end of said expansion screw, duct means defining a combustion chamber connecting each high pressure outlet of said compression screw to a high pressure inlet of said expansion screw, and means for admitting fuel into each combustion chamber.

2. A rotary external combustion engine as claimed in claim 1 in which said fuel admitting means is of the continuous injection type.

3. A rotary external combustion engine as claimed in claim 1 in which the pinions which mesh with the compression screw lie in a plane containing the axis of the shaft at an angle to the plane of the pinions meshing with the turbine screw, and compression chamber outlet and expansion chamber inlet means are positioned in each of two diametrically opposite angles formed by said planes.

4. A rotary external combustion engine as claimed in claim 1 in which the diameter of that portion of the casing means encircling the expansion chamber is larger than that encircling the compression chamber.

5. A rotary external combustion engine as claimed in claim 1 comprising means for maintaining a continuous flow of sealing liquid adjacent the surfaces of said screws in contact with said casing means and pinions, a drainage duct connecting said compression chambers to said expansion chambers, centrifuge means positioned at the outlet end of the compression chamber to separate the gas leaving said chamber from the sealing liquid and route the liquid to the expansion chamber inlet through said drainage duct, and baffle means in said drainage duct which serves to delay the flow of liquid through said duct so as to maintain a ring of liquid in the end of said compression chamber adjacent said collar which prevents the entry of air into said drainage duct, thus diverting said air to said combustion chambers.

6. A rotary external combustion engine as claimed in claim 5 in which the centrifuge means comprises radially extending blades having a radial dimension less than that of the upper portions of the threads of said expansion screw.

7. A rotary external combustion engine as claimed in claim 1 comprising means for maintaining a continuous flow of sealing liquid adjacent the surfaces of said screws in contact with said casing means and pinions, a liquid reservoir connected to collect liquid leaving the expansion chamber, ducts connecting said chamber to the compression chamber, and pumps connected to recycle said liquid from said reservoir.

8. A rotary external combustion engine as claimed in claim 7 comprising heat exchange means and liquid purifying means connected between said reservoir and said compression chamber.

9. A rotary external combustion engine as claimed in claim 7 comprising a fuel pump connected to supply said fuel admitting means, both said fuel pump and said liquid recycling pump being driven from said common shaft, two variable speed transmissions through which said shaft drives said recycling pumps and fuel pump respectively, and means for simultaneously adjusting the speeds of said variable speed transmissions so that the compression ratio of the engine and the rate of fuel injection may be simultaneously regulated.

10. A rotary external combustion engine as claimed in claim 1 in which the collar separating the compression and expansion chambers is provided with peripheral grooves permitting liquid to flow from said compression chamber to said expansion chamber.

11. An engine as claimed in claim 1 comprising a pair of pinions in engagement with each screw.

12. An engine as claimed in claim 1 comprising means for varying the rate at which sealing liquid is supplied to said compression screw so as to vary the compression ratio of said compressor.

13. A gas compressor comprising a drive shaft, a screw mounted on said drive shaft, said screw comprising a base portion having an hour-glass-shaped axial cross-section and a plurality of discrete threads carried on said base, each extending from one end to the other of said screw with their crests lying in a cylindrical locus, casing means in which said screw is rotatably mounted and comprising an inner wall cooperating with the crests of said threads to form with each pair of adjacent threads a compression chamber for the gas which is closed off at one end of said screw, a high pressure outlet from said compressor at said one end of said screw and a low pressure inlet at the opposite end of said screw, at least one gear wheel driven by said screw, said gear wheel being mounted to rotate about an axis transverse to that of said screw, and positioned to have a plurality of its teeth simultaneously in engagement between the threads of said screw, in which position they block off from said low pressure inlet those portions of said compression chambers which lie between said outlet and the teeth on said gear wheel, said high pressure outlet being positioned immediately adjacent said gear wheel to register with the adjacent end of each of said compression chambers successively as said screw rotates, and each thread traversing a distance around the circumference of said screw no greater in length than that circumference divided by the number of gear wheels.

14. A compressor as claimed in claim 13 comprising at least one pair of gear wheels meshing with said screw, said gear wheels being positioned on diametrically opposite sides of said screw and said threads extending over an arc on said screw substantially equal to the distance between said gear wheels measured along the circumference of said screw.

15. A compressor as claimed in claim 13 in which said low pressure inlet is positioned to simultaneously supply the adjacent ends of all of said compression chambers.

16. A compressor as claimed in claim 13 in which the hour-glass contour of said base extends radially outward at the outlet end of said screw until it intersects the crests of said threads.

17. A rotary external combustion engine as claimed in claim 1 comprising means for injecting a sealing liquid at the inlet end of said compression screw.

18. A rotary external combustion engine as claimed in claim 17 comprising means for driving said injecting means at a speed which injects said liquid at a speed substantially equal to the peripheral speed of said gear wheels.

19. A rotary external combustion engine as claimed in claim 1 in which said means closing the high pressure ends of said compression chambers is a cylindrical portion formed on said compression screw and integral with the threads thereon at the high pressure outlet end thereof, said engine likewise comprising a cylindrical portion integrally formed on said expansion screw and interconnecting and integral with the ends of the threads thereon at the end of said expansion screw nearest said compression screw.

20. A gas compressor as claimed in claim 16 in which the high pressure ends of said compression chambers are closed off by means of a cylindrical portion formed on said compression screw, said cylindrical portion being integral with the threads on said screw at the high pressure outlet end thereof.

References Cited by the Examiner
UNITED STATES PATENTS

| | | | |
|---|---|---|---|
| 1,409,868 | 3/22 | Kien | 230—143 |
| 2,147,405 | 2/39 | Horton. | |
| 2,603,412 | 7/52 | Chilton | 230—150 |
| 2,709,336 | 5/55 | Nilsson et al. | |
| 2,716,861 | 9/55 | Goodyear. | |
| 2,994,276 | 8/61 | Matson | 103—125 |

SAMUEL LEVINE, *Primary Examiner.*

JULIUS E. WEST, *Examiner.*